Jan. 12, 1960 C. W. SINCLAIR 2,920,723
INTERNAL EXPANDING BRAKE
Filed Dec. 18, 1953 2 Sheets-Sheet 1

INVENTOR.
CHARLES W. SINCLAIR.
BY

Jan. 12, 1960   C. W. SINCLAIR   2,920,723
INTERNAL EXPANDING BRAKE
Filed Dec. 18, 1953   2 Sheets-Sheet 2

INVENTOR.
CHARLES W. SINCLAIR.
BY ent Office

2,920,723
Patented Jan. 12, 1960

2,920,723

INTERNAL EXPANDING BRAKE

Charles W. Sinclair, Detroit, Mich., assignor to Kelsey-Hayes Company, a corporation of Delaware Application December 18, 1953, Serial No. 398,924

2 Claims. (Cl. 188—78)

The invention relates to brakes and refers more particularly to brakes of that type provided with an internal friction device having separable ends, one of which is adapted to anchor in one direction of rotation of the brake drum and the other of which is adapted to anchor in the other direction of the brake drum.

The invention has for some of its objects to provide an improved brake employing a pair of anchor pins for the friction device and having a strong, substantial construction of support for the anchor pins; to provide an improved brake so constructed that the anchor pins may be readily inserted and removed; to provide an improved brake employing cam means for spreading apart the separable ends and in which the support for the anchor pins limits axial movement of the cam means in one direction; to provide an improved brake employing an internal retracting spring and in which the support embraces the spring and with the friction device encircles and forms a tunnel for the spring; and to provide an improved brake in which the friction device comprises a pair of brake shoes with an adjustment device between adjacent ends and the backing plate forming part of the support has a peripheral recess for receiving part of the adjustment device.

These and other objects of the invention will become apparent from the following description taken in connection with the accompanying drawings in which—

Figure 1:
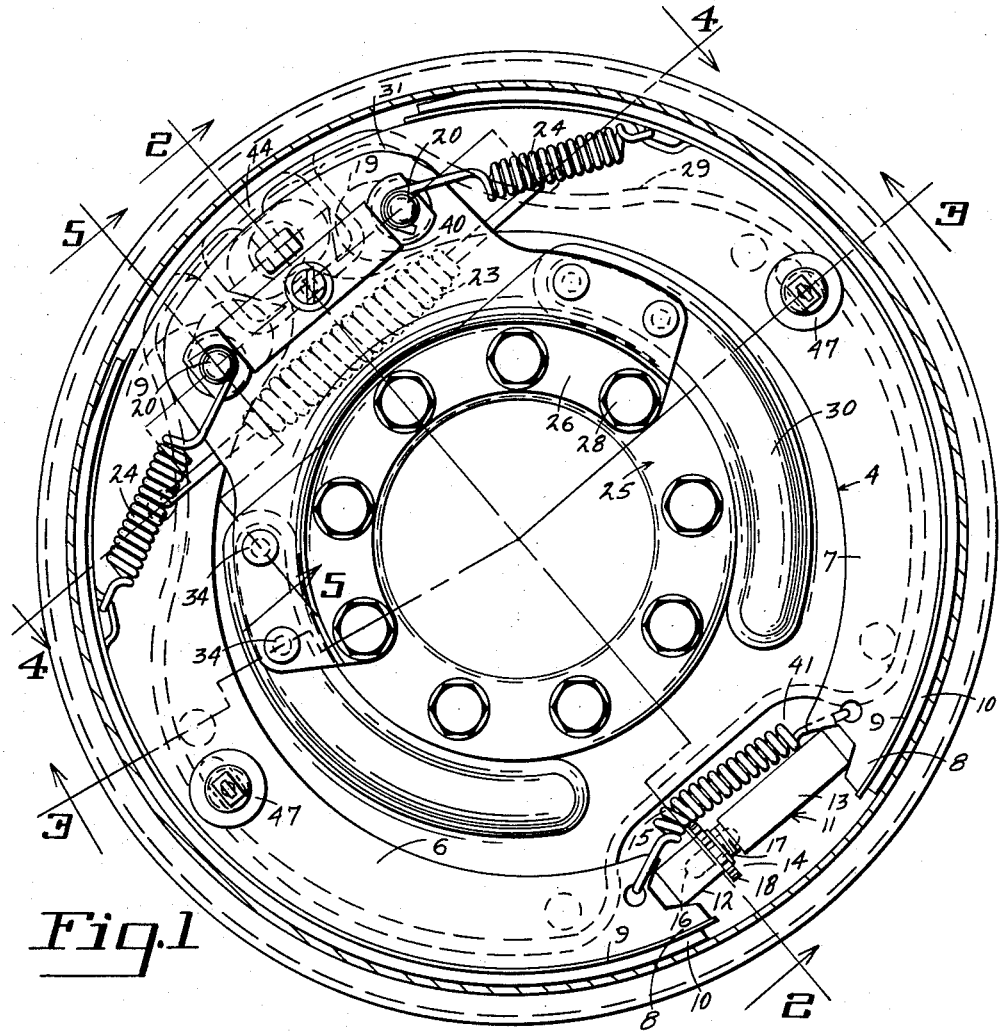
Figure 5:
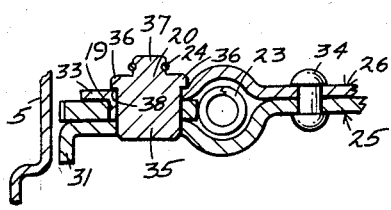
Figure 2:
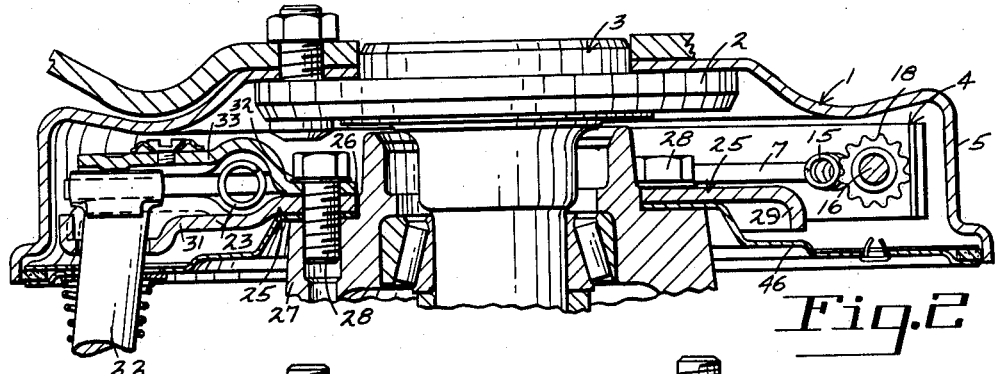
Figure 3:
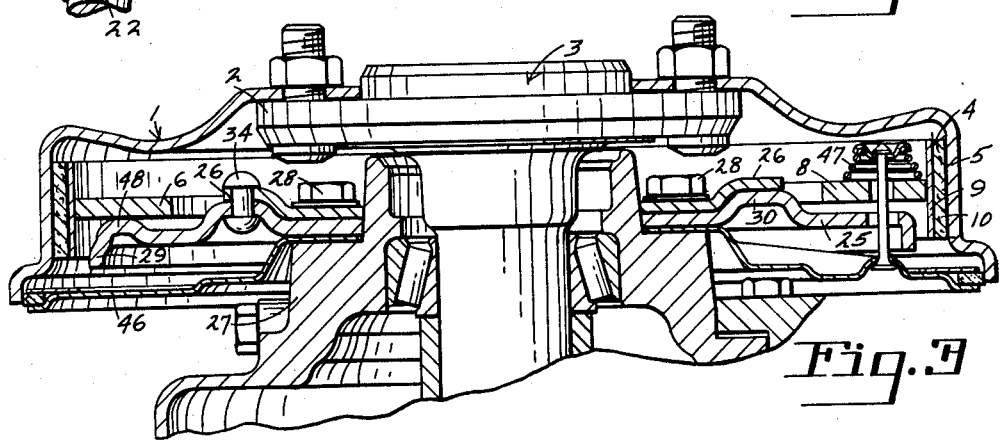
Figure 4:
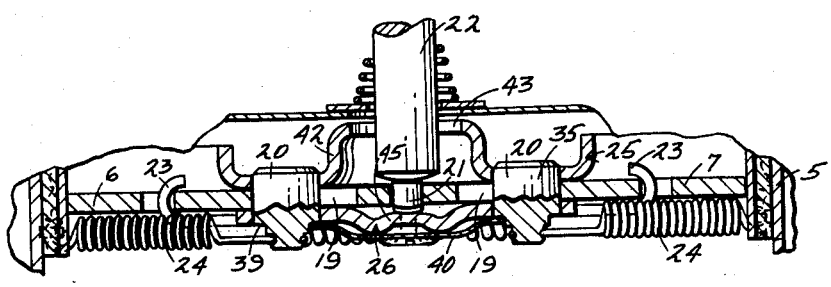

Figure 1 is a side elevation partly broken away of a brake embodying the invention;

Figures 2, 3, 4 and 5 are cross sections on the lines 2—2, 3—3, 4—4 and 5—5, respectively, of Figure 1.

The brake is designed particularly for use on motor vehicles and comprises the brake drum 1, mounted on the fixed radial flange 2 of the wheel hub 3 and the friction device 4 within the brake drum and engageable with its brake flange 5. The friction device comprises the pair of brake shoes 6 and 7, each of these shoes being of T-section and having the radial web 8 and the arcuate flange or rim 9 secured to the web, and the brake lining 10 secured to the arcuate flange or rim and engageable with the brake flange 5. The shoes have adjacent separable ends adapted to be spread apart to move the shoes into engagement with the brake flange, and the shoe have between their other ends the adjustment device 11 for adjusting these other ends relative to each other to take care of wear of the lining 10.

The adjustment device comprises the axially aligned members 12 and 13, the rotatable member 14 and the coil spring 15. The members 12 and 13 have bifurcated ends embracing and abutting recessed portions of the ends of the webs 8. The rotatable member 14 has the pin 16 journalled in the member 12, the shank 17 extending into and threadedly engaging the member 13 and the notched adjusting wheel 18 abutting the member 12. The coil spring 15 is connected to the ends of the shoe webs and holds the same in engagement with the members 12 and 13 and extends into a notch in the wheel 18 to hold the same in its position of rotative adjustment.

The separable ends of the shoes are formed with the elongated openings 19 through which the anchor pins 20 extend. These ends are adapted to be separated by an actuator formed of the cam 21 at the inner end of and rotatable with the cam shaft 22, the cam being located between the ends of the webs 8 and being adapted upon turning to move these ends away from each other. The cam shaft is pivotally mounted at its outer end so that in addition to being rotatable it is angularly movable. 23 is a main coil spring for retracting the shoes and 24 are auxiliary coil springs for assisting the main coil spring to retract the shoes and for also normally holding the cam in its predetermined off or inoperative position. The main coil spring is connected to the shoe webs at the separable ends and extends radially inside the anchor pins 20 and the auxiliary coil springs have the same strength and are connected to the shoe webs at the separable ends and to the anchor pins.

The support for the anchor pins comprises the backing plate 25 and the reinforcing plate 26 within the brake drum. The backing plate in the present instance is mounted on the axle housing 27 and secured thereto by suitable means, such as the bolts 28. The backing plate is formed with the peripheral reinforcing flange 29 and the diametrically opposite arcuate reinforcing ribs 30, and has the radial projection 31 at the axially inner or inboard side of the webs of the shoes of a width to accommodate the pair of anchor pins 20. The reinforcing plate 26 has the arcuate mounting portion 32 and the radial projection 33, the latter being substantially coextensive with the radial projection 31 and being located at the axially outer or outboard side of the webs of the shoes. The mounting portion 32 is secured against the backing plate 25 and to the axle housing 27 by the adjacent bolts 28 and is also secured to the backing plate along the arcuate ribs 30 by the rivets 34.

To provide for readily inserting and removing the anchor pins 20, they are constructed to be inserted from the axially outer or outboard side of the plate 26 in an inboard direction through this plate, the separable ends of the webs of the shoes 6 and 7 and the plate 25. Each of the anchor pins has the cylindrical body 35, the diametrically opposite flanges 36 and the reduced portion 37. The ends of the body 35 engage and are supported by the plates 25 and 26 while the intermediate portion of the body extends through the associated shoe web. The flanges 36 form the shoulders 38 abutting the plate 26 and limiting the inboard movement of the anchor pin and the shoulder 39 at the axially outer or outboard end of the anchor pin is abutted by the retainer 40 which holds the anchor pin from outboard movement. The retainer is a formed spring steel strip detachably secured between its ends to the radial projection 33 of the plate 26 and having its ends engaging the shoulders 39 of both anchor pins. The auxiliary coil springs 24 detachably engage the reduced portions 37 of the anchor pins so that when these springs are disengaged from the anchor pins, the latter may be readily inserted or removed.

Both of the plates 25 and 26 have their portions immediately adjacent the coil spring 23 curved to embrace and clear the coil spring and these portions cooperate with the portions of the webs 8 of the shoes in the vicinity of the anchor pins 20 to encircle and form a tunnel for the coil spring.

The backing plate 25 is formed with the peripheral recess 41 diametrically opposite the radial projection 31 for receiving the adjustment device 11. Also the radial projection 31 is formed with the boss 42, having its bottom provided with the hole 43 extending chord-wise and of a size to permit free movement therethrough of the cam 21 and to freely receive the cam shaft 22. The radially outer portion 44 of the side wall of the boss extends between adjacent ends of the peripheral flange 29 and the bottom of the boss is spaced from the webs 8 at the separable ends of the shoes a distance greater than the axial dimension of the cam to enable the cam to be turned to a position to extend between the ends of the webs after the cam has been inserted through the hole. The radial portion 33 of the reinforcing plate 26 is formed with the boss 45 for engaging the cam 21 and limiting its movement in an axially outward or outboard direction.

46 is a closure plate for the brake drum clamped against the axle housing 27 by the backing plate, 25 and 47 are resilient hold-down devices of conventional construction for holding the central portions of the webs 8 of the shoes against the rounded bosses 48 of the backing plate, the pins of the devices extending from the closure plate freely through the backing plate and shoe webs.

What I claim as my invention is:

1. A brake comprising a brake drum, a friction device within and engageable with said drum and having separable ends, an actuator between said separable ends for moving said friction device into engagement with said drum, a backing plate at one side of said separable ends, a second plate at the other side of said separable ends, a retainer on said second plate, and anchor pins at said separable ends for anchoring said friction device, said anchor pins being insertable in an inboard direction through said plates and separable ends from the outboard side of said second plate and having shoulders facing in opposite directions, certain of said shoulders being engageable with said second plate for limiting the movement of said anchor pins in an inboard direction and certain other of said shoulders being engageable by said retainer to hold said anchor pins in place.

2. A brake comprising a brake drum, a friction device within and engageable with said drum and having separable ends, an actuator between said separable ends for moving said friction device into engagement with said drum, plates at opposite sides of said separable ends, a retainer on one of said plates, and anchor pins at said separable ends for anchoring said friction device, said anchor pins being insertable axially through said plates and separable ends and having means engageable with one of said plates and said retainer for holding said anchor pins in place.

References Cited in the file of this patent

UNITED STATES PATENTS

| | | |
|---|---|---|
| 1,690,855 | Christensen | Nov. 6, 1928 |
| 1,871,441 | Bendix | Aug. 16, 1932 |
| 1,900,178 | Frank | Mar. 7, 1933 |
| 2,065,382 | Levy | Dec. 22, 1936 |
| 2,149,614 | Main et al. | Mar. 7, 1939 |
| 2,209,772 | Goepfrich et al. | July 30, 1940 |
| 2,475,491 | Goepfrich et al. | July 5, 1949 |

FOREIGN PATENTS

| | | |
|---|---|---|
| 586,844 | France | Jan. 9, 1925 |
| 1,035,206 | France | Apr. 15, 1953 |
| 1,042,103 | France | June 3, 1953 |
| 657,117 | Great Britain | Sept. 12, 1951 |